(12) United States Patent
Schmitt

(10) Patent No.: US 8,331,633 B2
(45) Date of Patent: Dec. 11, 2012

(54) METHOD AND SYSTEM FOR MULTI-MODE MECHANICAL RESONATOR

(75) Inventor: Rainer M. Schmitt, Palm Beach Gardens, FL (US)

(73) Assignee: Sonavation, Inc., Palm Beach Gardens, FL (US)

( * ) Notice: Subject to any disclaimer, the term of this patent is extended or adjusted under 35 U.S.C. 154(b) by 947 days.

(21) Appl. No.: 12/117,468

(22) Filed: May 8, 2008

(65) Prior Publication Data
US 2009/0279748 A1    Nov. 12, 2009

(51) Int. Cl.
*G06K 9/78* (2006.01)
*G01B 7/16* (2006.01)
(52) U.S. Cl. .......................................... 382/124; 73/774
(58) Field of Classification Search ............... 73/774; 382/124
See application file for complete search history.

(56) References Cited

U.S. PATENT DOCUMENTS

| 5,689,576 A * | 11/1997 | Schneider et al. | 382/124 |
| 2007/0132342 A1* | 6/2007 | Scott | 310/338 |

OTHER PUBLICATIONS

Search Report and Written Opinion for International Application No. PCT/US09/02887 mailed Aug. 12, 2009, 9 pages.

* cited by examiner

*Primary Examiner* — Hezron E Williams
*Assistant Examiner* — Gregory J Redmann
(74) *Attorney, Agent, or Firm* — Kenneth J. Lukacher Law Group

(57) ABSTRACT

Provided is a fingerprint sensor including one or more mechanical devices for capturing the fingerprint. The resonators are configured to be mechanically damped based upon an applied load.

15 Claims, 9 Drawing Sheets

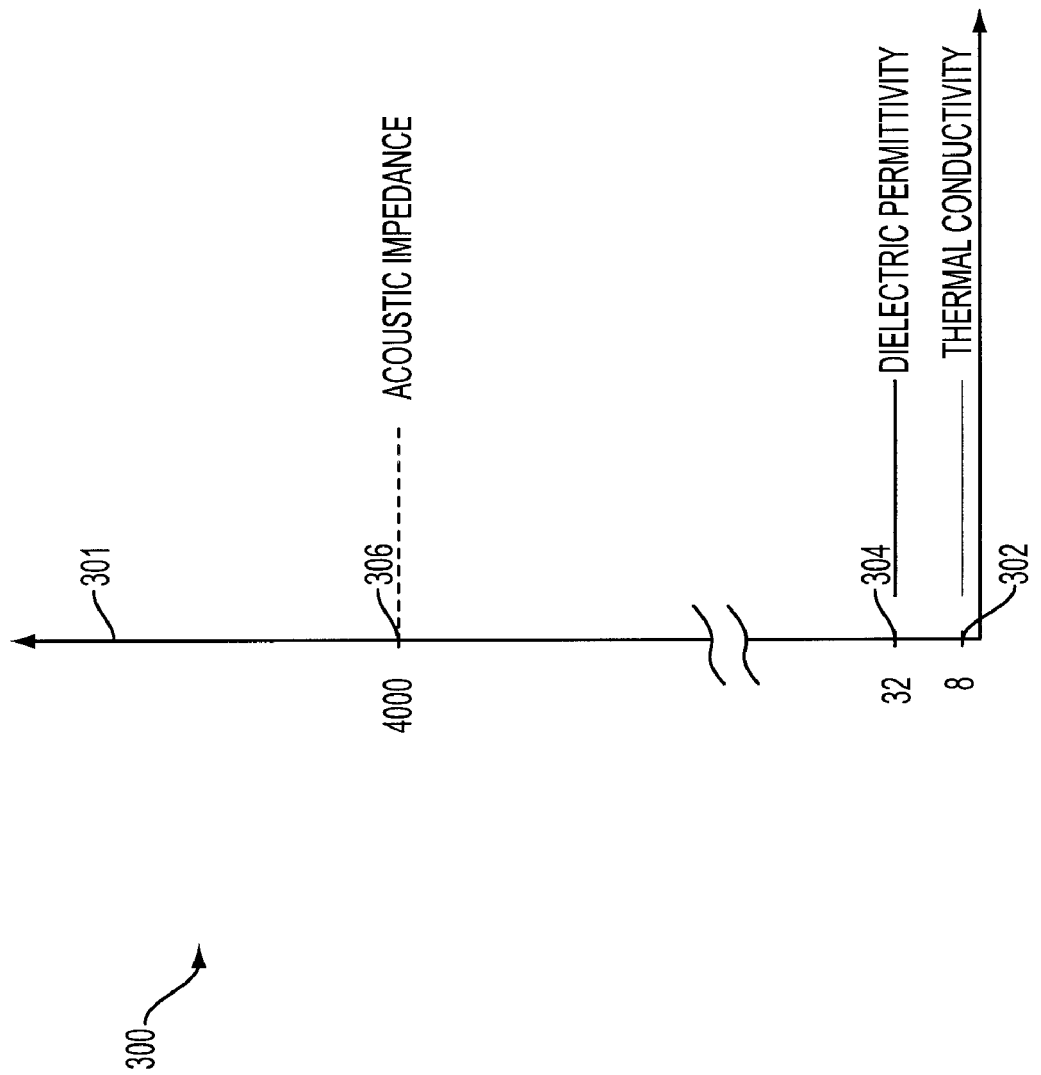

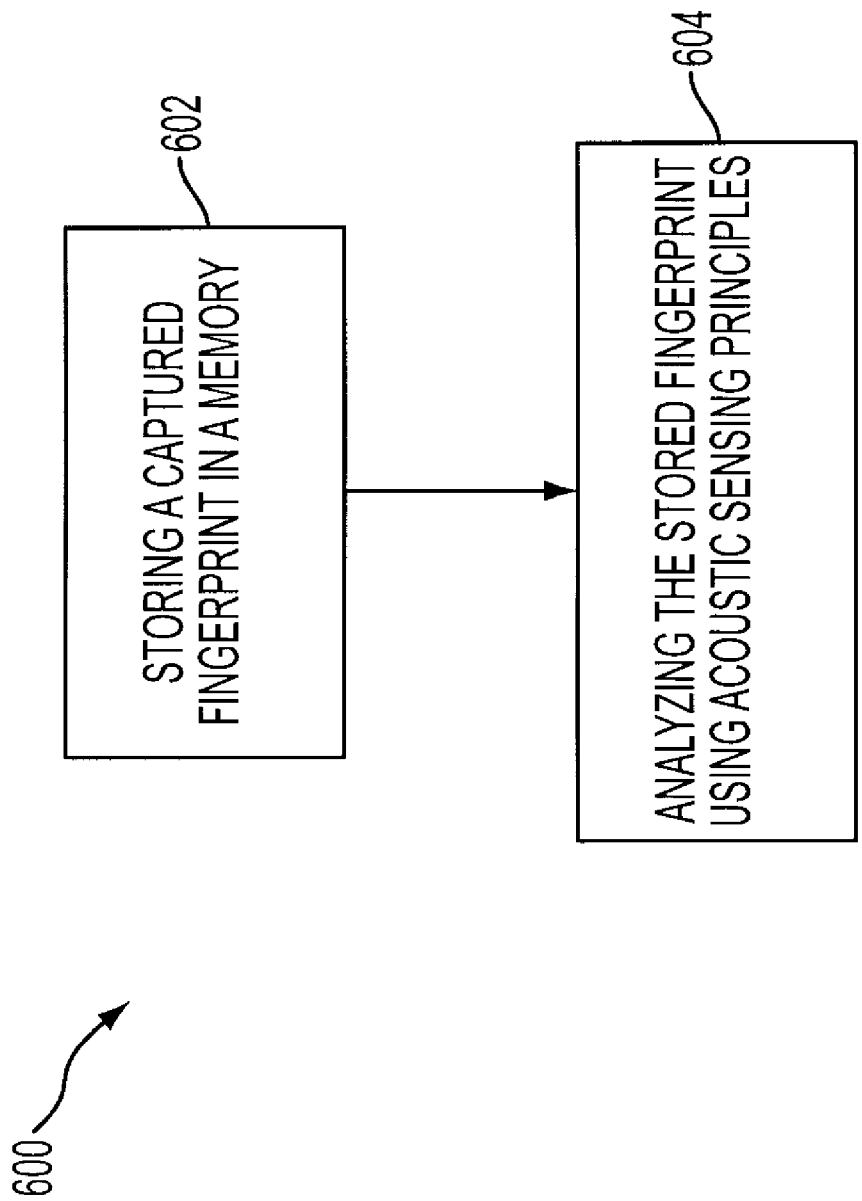

METHOD AND SYSTEM FOR MULTI-MODE MECHANICAL RESONATOR

BACKGROUND OF THE INVENTION

1. Field of the Invention

The present invention generally relates to biometrics.

2. Related Art

A variety of well known techniques exist for sensing, measuring, and identifying biometric characteristics. These techniques focus on unique characteristics associated with structures that form the biometrics. By way of example, fingerprints, defined by ridges and valleys in a finger, are one such biometric.

As known to those of skill in the art, fingerprints are defined by unique structures on the surface of the finger called ridges and valleys. These ridges and valleys can be sensed, measured, and identified based upon a number of different modalities.

For example, some fingerprint measurement modalities rely on density values associated with the ridges and valleys. Others rely on dielectric permittivity as measured when an electric current if passed through the ridges and valleys. With respect to dielectric permittivity for example, the permittivity of a ridge (i.e., fingerprint tissue), is different from permittivity of a valley (i.e., air between the ridges).

Capacitive sensing is one technique that can be used to detect changes in permittivity. With capacitive sensing, capacitance values generated when a sensor plate (electrode) touches a ridge are different than those generated when the sensor is exposed to a valley.

Yet another modality is thermal conductance which is a measure of the temperature differences between the ridges and valleys. Optics are yet another modality. Optical techniques rely on an optical index of refractive and reflective changes between the ridges and the valleys.

Although the modalities differ, each approach seeks to accurately distinguish ridges from valleys in order to image the fingerprint. Some modalities, or techniques, are inherently more accurate that others relative to distinguishing ridges from valleys, as will be discussed more fully below. A relative assessment of this accuracy can be characterized in terms of contrast ratio. In a biometric context, contrast ratio is a measure of the contrast between tissue (i.e., fingerprint ridge) to air (i.e., fingerprint valley).

Viewed from another perspective, contrast ratio is an objective way to quantify potential differences in accuracy between thermal based modalities, those that rely on dielectric permittivity, from optical based modalities and others. The higher the contrast ratio, the greater potential for more accurate biometric sensing. When constructing a sensing system that incorporates, for example, one of the modalities noted above, designers must consider not only contrast ratio, but manufacturability, along with costs.

Thermal and dielectric permittivity based sensing systems, for example, have relatively low contrast ratios, as will be discussed more fully below. That is, under ideal conditions and with the utmost care and consideration during design and/or manufacturing, these systems are inherently limited in the accuracy of their measurement output data.

What is needed, therefore, are highly reliable techniques for sensing biometrics. What are also needed are techniques for sensing biometrics, such a fingerprint ridges and valleys that have higher contrast ratios than traditional sensing systems.

BRIEF SUMMARY OF THE INVENTION

In one embodiment, the present invention includes a fingerprint sensor including one or more mechanical devices for capturing the fingerprint. The resonators are configured to be mechanically damped based upon an applied load.

Additional features and advantages of the invention will be set forth in the description that follows, and in part will be apparent from the description, or may be learned by practice of the invention. The advantages of the invention will be realized and attained by the structure and particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 3 is a graphical illustration of the contrast ratios of the sensing techniques shown in FIG. 2;

FIG. 6 is an exemplary method of practicing an embodiment of the present invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, may be implemented in many different embodiments. Any actual software code implementing the present invention is not limiting of the present invention. Thus, the operational behavior of the present invention will be described with the understanding that modifications and variations of the embodiments are possible, given the level of detail presented herein.

Advantages of Acoustic Impediography Sensing

As noted above, the present invention provides a more accurate and reliable alternative to the traditional biometric sensing systems. More particularly, the present invention uses acoustic impediography as a technique for sensing biometric, such as fingerprint ridges and valleys.

Figure 1A:
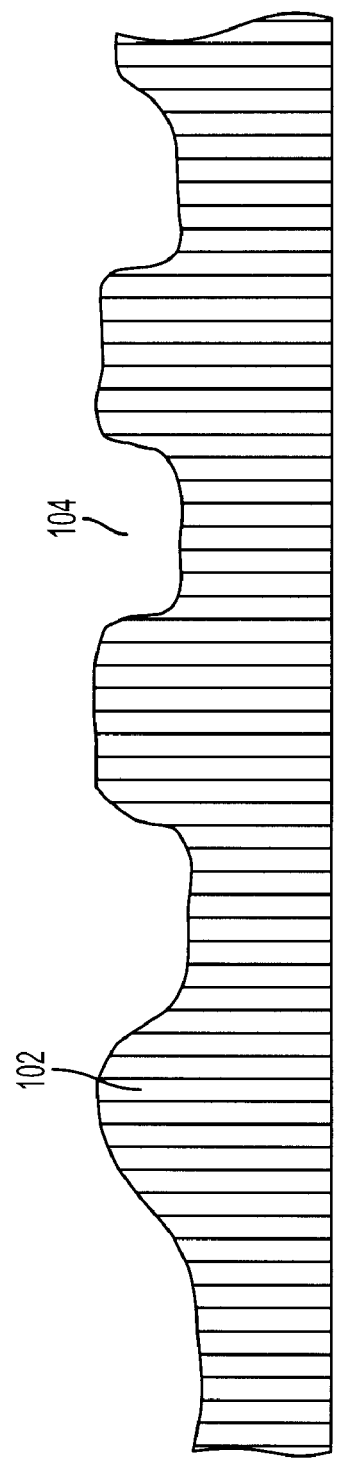
FIG. 1A is an illustration of the basic structure of a fingerprint.
Figure 1B:
FIG. 1B is a more traditional view of the fingerprint structures illustrated in FIG. 1A.

FIG. 1A is an illustration of the basic structure 100 of a fingerprint. In FIG. 1A, the basic fingerprint structure 100 includes ridges 102 and valleys 104, which combine to form an entire fingerprint. FIG. 1B is an illustration of such a fingerprint 106. Thus, the present invention utilizes principles of acoustic impediography to more accurately and reliably distinguish the ridges 102 from the valleys 104 associated with the fingerprint 106.

The most significant advantage of acoustic impediography is a much higher contrast ratio, when compared with other modalities that rely, for example, on dielectric permittivity and thermal conductivity.

Figure 2:
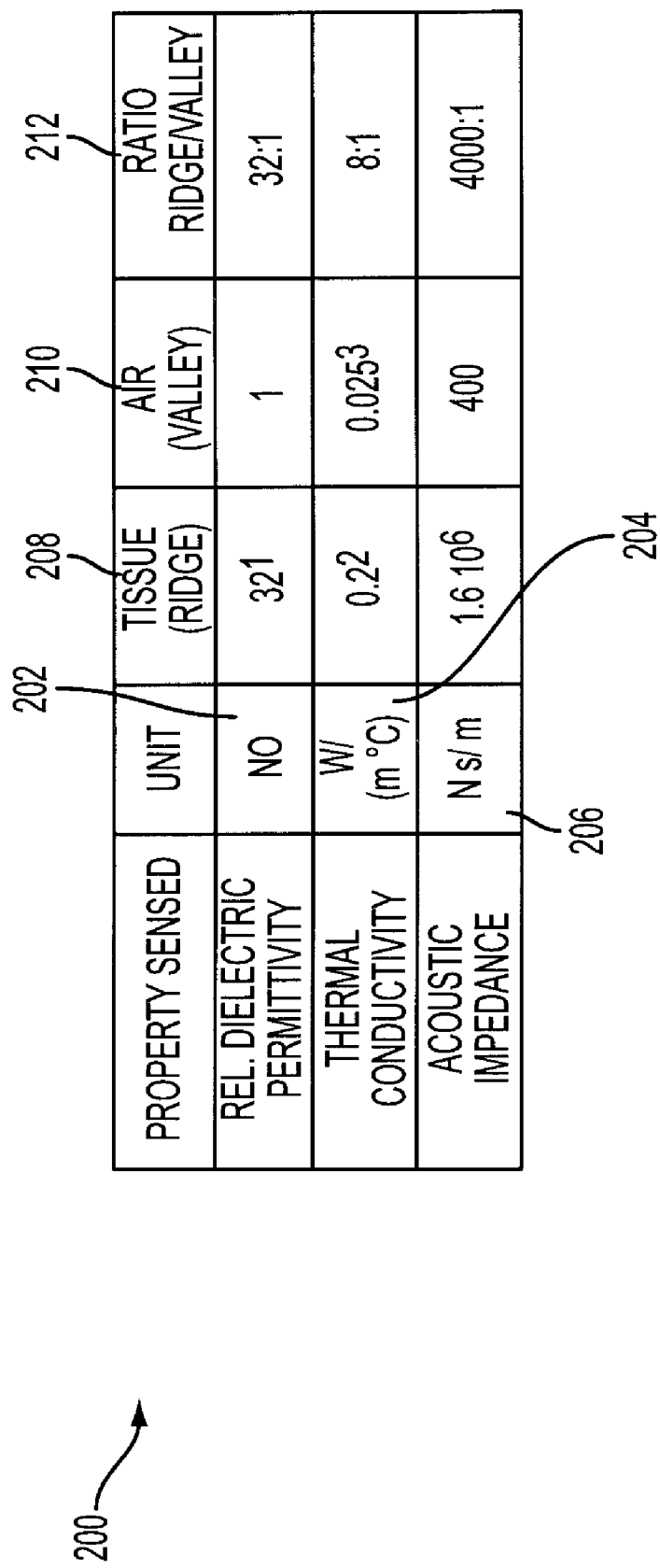
FIG. 2 is a tabular illustration conveying contrast ratios among different biometric sensing techniques.

FIG. 2 is a tabular illustration 200 of comparisons of sensing tissue and air using dielectric permittivity, thermal conductivity, and acoustic impedance. Note that each technique is expressed in units of measure uniquely associated with that particular technique.

In FIG. 2, for example, relative dielectric permittivity is expressed in terms of a unit-less quantity 202. Thermal conductivity is expressed in terms of watts (W) per meter (m)-centigrade (C) 204. Acoustic impedance is expressed in terms of density (N) times the speed of sound per meter (m) 206. Each of these expressions is shown in terms of fingerprint tissue (i.e., ridge) column 208 and fingerprint air (i.e., valley) column 210. A contrast ratio column 212 compares the ridge column 208 with the air column 210 for the respective dielectric, thermal conductivity, and acoustic impedance techniques.

As illustrated FIG. 2, acoustic impedance yields a significant improvement in contrast ratio 212 in comparison to the other techniques. For example, the illustration 200 shows that the contrast ratio of thermal conductivity in tissue compared to thermal conductivity of air, is about 8:1. The contrast ratio of dielectric permittivity in tissue to the dielectric permittivity of air is about 32:1 (four times better than that of thermal conductivity). However, the contrast ratio of acoustic impedance in tissue to the acoustic impedance in air is about 4000:1, more than 100 times better than even the improved contrast ratio of dielectric permittivity. Thus, as can be seen, acoustic impediography, having the higher contrast ratio, is inherently more capable of distinguishing ridges from valleys that thermal conductivity and dielectric permittivity.

FIG. 3 is a graphical illustration 300 that displays the superior contrast ratio of acoustic impediography, as discussed above in relation to FIG. 2, along a vertical axis 301. More particularly, a point 302 represents the contrast ratio of thermal conductivity and a point 304 represents the contrast ratio of dielectric permittivity, along the axis 301. A point 306 represents the contrast ratio of acoustic impedance along the vertical axis 301. As is graphically depicted in FIG. 3, acoustic impedance has a significantly better contrast ratio for tissue and air than dielectric permittivity and thermal conductivity. Although FIGS. 2 and 3 only compare acoustic impedance with thermal conductivity and dielectric permittivity, acoustic impedance provides significant advantages over other biometric sensing modalities.

The discussion above primarily focuses on the advantages of acoustic impediography as an inherently superior sensing technique to other known sensing techniques. However, in order to apply the superiority of imaging fingerprints using acoustic impediography in a practical manner, acoustic impediography based techniques must be incorporated into constructing sensing device and/or resonators.

Acoustic Impediography Based Sensing Devices

By way of background, attempts were made in the 1970s and 1980s to apply acoustic impediography sensing to imaging tissue samples in the medical arena. These attempts, however, were only marginally successful, at best, because in order to make this technique effective for medical use, ultrasound signals had to be transmitted into tissue. After transmission into tissue, one then had to observe the reflection and reconstruct from the reflection, an image of the tissue based upon various impedances throughout the tissue. In other words, these early applications relied on acoustic impediography as a reconstruction technique as opposed to a sensing technique. These early applications, however, proved to be too error prone and ineffective for reconstructions and were largely abandoned.

Embodiments of the present invention, however, are able to effectively utilize acoustic impediography as a biometric sensing technique. This use is possible in part because in the present invention, only tissue surface features are of analyzed. The inventors of the subject matter of the present application have discovered that sensing these surface features (i.e., fingerprint ridges and valleys) using acoustic impediography, significant enhancements to biometric sensing and measurement can be derived.

More particularly, the present invention incorporates principles of acoustic impediography into construction and use of mechanical resonators/oscillators. For example, one embodiment of the present invention uses an arrangement of piezo pillars embedded in a interstitial material suitable to fix them in place to form a matrix of piezo-electric resonators used to sense the ridges and valleys of the fingerprint.

By way of background, a pillar sensor matrix can be utilized, as an example, for imaging fingerprint ridges and valleys. In exemplary embodiments of the present invention, a sensor matrix comprises piezo pillars embedded in a matrix material, such as e.g. polymer, forming a 1-3 piezo composite structure. Using a crosshatched electrode pattern, pillars are excited by an electrical input signal, generating acoustic waves inside the pillar due to the inverse piezo-electrical effect. If the sensor is constructed accordingly, the pillars' oscillations are more or less damped by the ridge or valley of the fingerprint structure in physical contact with the sensors upper surface. The damping is higher, for example, when exposed to a ridge and is lower if exposed to a valley. The corresponding physical property related to the damping is the acoustic impedance, which is approximately 400 Rayl for the valley, and approx. 1,500,000 Rayl for the ridge.

The actual damping can be measured by monitoring the pillars mechanical oscillations which are transferred into electrical current oscillations via the direct piezo-electrical effect.

It is equivalent to measure the mechanical Q (ratio of reactance to resistance in the equivalent electric series circuit representing the mechanical vibrating resonant system) of the resonating pillar which switches from a higher value to a lower value if the acoustic load switches from a valley to a ridge. It is also equivalent to measure the current, Ip, flowing through the element, if the acoustic load switches from low to high. Higher loads are associated with lower Ip currents and low loads with higher Ip currents. Using the impediography method as described here, the impedance load on top of each pillar can be estimated in multiple ways from the pillar resonator property Qm. For example, the impedance load can be determined (i) analytically and (ii) by calibration.

In case i) an approximate equation for the minimum impedance of a single pillar can be derived relating the pillar complex impedance to the top and bottom load conditions including the pillars electrical mechanical and piezoelectric properties. in case ii) the pillars resonance property e.g. the mechanical quality factor Qmn is estimated for various top loads Zn leading to a calibration curve from which for a given Qm the corresponding unknown acoustical impedance of the load can be determined using a look up table (not shown). This look up table can be integrated into the data processing flow, thus a quantitative map for the acoustic impedance is obtained from the individual pillar response across the pillar matrix.

However, for the fingerprint application it is not required to estimate the surface acoustic impedance directly and quantitatively, it is sufficient to observe a certain difference in the directly measured property (Ip, Qm) to differentiate between ridge and valley.

It is important to avoid or minimize any lateral losses of acoustic energy (i.e., dissipating energy) from the longitudinal mode of pillar oscillation, preferably the rod extension mode, into lateral modes, generated from longitudinal modes due to lateral material coupling. These lateral modes will leak energy into the adjacent medium, into which the pillar is embedded. As the pillar oscillates in a longitudinal mode, shear waves are generated by the pillar side areas facing the matrix material. These shear waves are traveling away from the pillar creating substantial loss of energy and hence these waves are damping the pillars oscillation. This process is discussed more fully below.

The spatial resolution of any fingerprint image obtained by impediography is basically defined by the matrix structure, more precisely by the pillar pitch.

As a point of clarity, pillar matrix arrays can be manufactured using a number of different approaches, such as:
1. Dice & fill
2. Injection molding
3. Soft molding
4. "Cookie cutter"
5. Micro Machined Ultrasound Transducer Technology (MUT-Technology)
6. Sol Gel process
7. Thick PZT-film laser lift off Shear Wave Reflection Aspects of the present invention, however, focus on matrix construction. One element of importance in this construction is considering the shear wave generation and propagation within the matrix material. As understood by those of skill in the art, a shear wave is a type of seismic wave that involves oscillation of a material perpendicular to the direction in which the wave is traveling Using experimental results and numerical finite element modeling, it can be demonstrated that in case of matrix materials typically used for 1-3 piezo composites, such as various types of polymers [referring to the CUE data base[1]] the energy, leakage from the pillar of interest (poi) into the adjacent medium is so high that the pillar oscillation is damped at an extent where the effect of the top load on pillar damping becomes small compared to the damping through the matrix. This propagation makes it more difficult to distinguish between ridges and valleys.

[1]CUE Materials Database R L O'Leary, G Hayward, G Smillie and A C S Parr The Centre for Ultrasonic Engineering, University of Strathclyde, Glasgow, Scotland Version 1.2 Updated August 2005.

In the present application, techniques are provided to lower the effect of this shear wave leakage. In one such technique the pillar matrix is arranged in a manner such that the neighbor pillar reflects shear waves back to the pillar from which they emerged.

This shear wave reflecting effect contributes to the pillar Q if the reflecting neighboring pillars are within a distance (curve) of a wavelength of the shear wave generated by the poi. More specifically, the reflecting effect, and hence the pillars Q, is optimized if the distance is a quarter wavelength of the shear wave. This effect is enhanced if the pillars are of square cross-section. In this way each pillar of interest has four neighbors providing a parallel surface enhancing reflection.

Figure 4A:
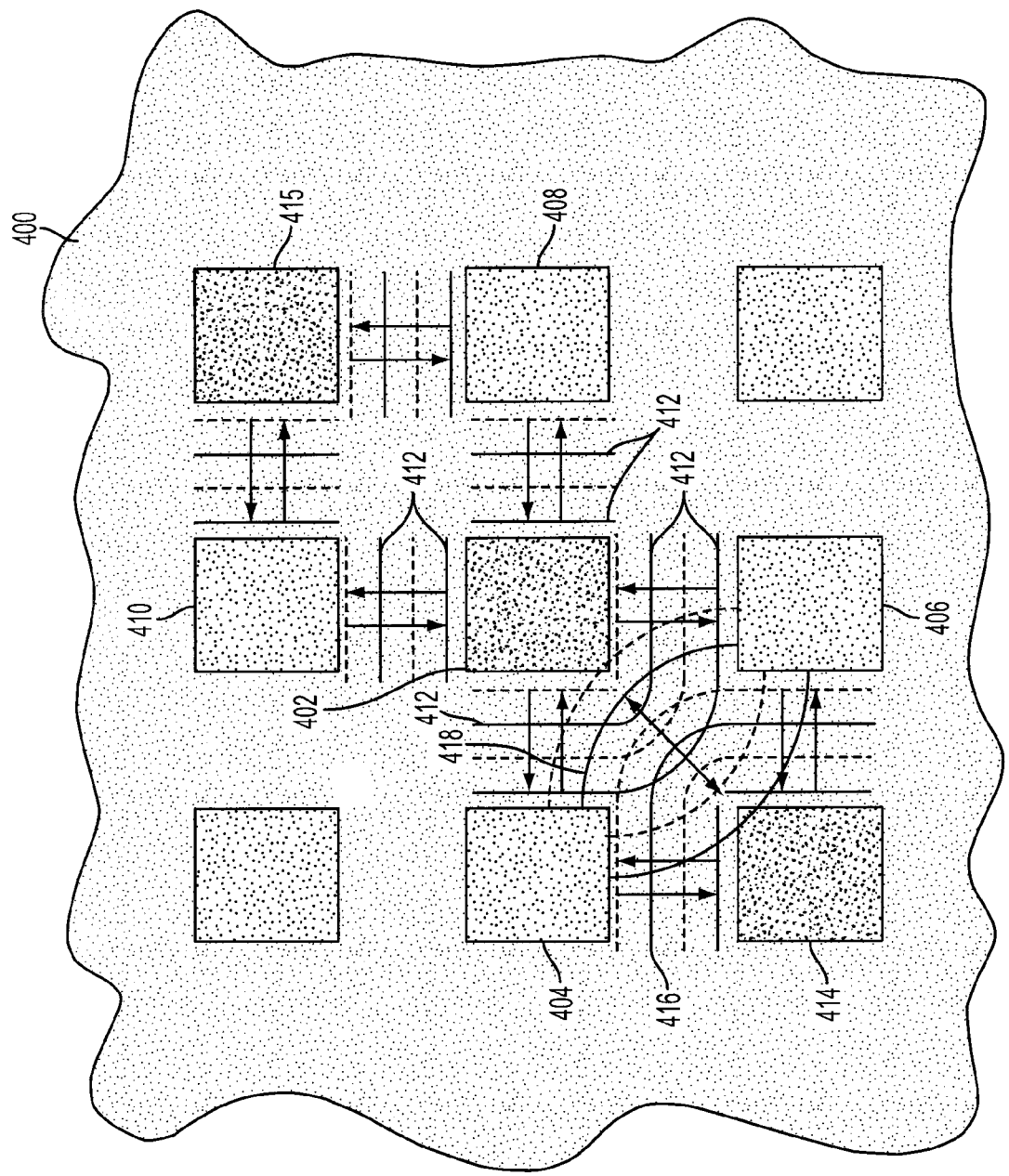
FIG. 4A is an illustration of an exemplary pillar matrix arranged in accordance with an embodiment of the present invention.

FIG. 4A is an exemplary illustration of a 3×3 pillar matrix 400 including pillars having a square cross-section. By way of example, the pillar matrix 400 includes a poi 402, along with adjacent neighboring pillars 404, 406, 408, and 410. As the poi 402 vibrates, shear waves 412 are generated and reflected into the adjacent neighboring pillars 404, 406, 408, and 410, and also into a corner pillar 414. Conversely, shear waves 416 and 418 are generated and are reflected off of the corner pillar 414 and reflected back into the poi 402. This corner reflection aspect is discussed more fully below.

If any of the neighboring pillars 404, 406, 408, or 410 oscillates at the same time as the poi 402, the shear waves from these neighbors directly reflecting on the poi 402 potentially interfere negatively with its ongoing oscillation. The inventor of the present application has discovered, however, that this negative effect can be substantially reduced. The present application demonstrates that if the pillars are electrically connected diagonally, with respect to the matrix orientation as illustrated in FIG. 4B, as opposed to vertically or horizontally, this negative effect can be reduced.

Figure 4B:
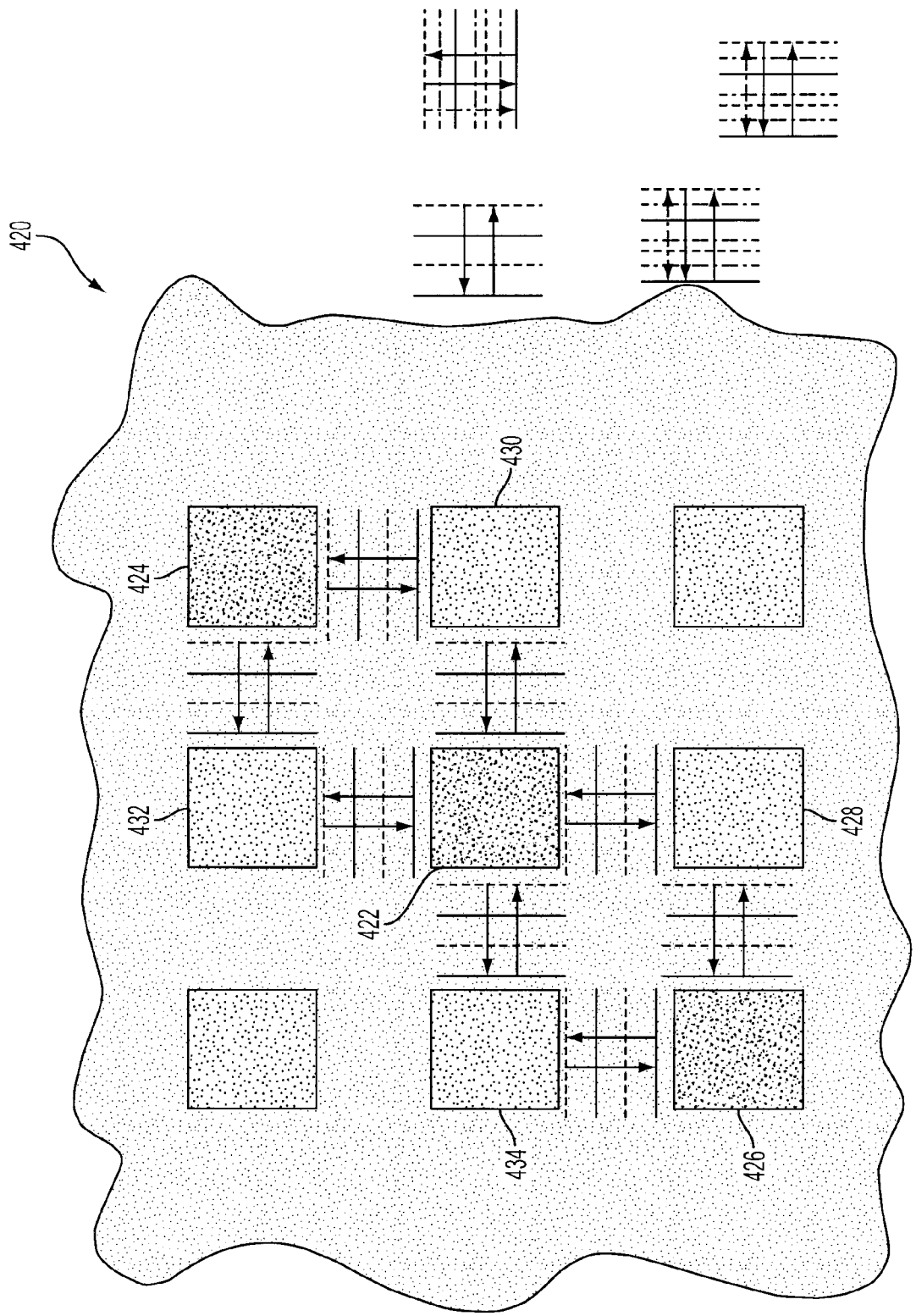
FIG. 4B is an illustration of an exemplary matrix having pillars connected diagonally.

For example, FIG. 4B is an illustration of an exemplary matrix 420 having a poi 422 connected diagonally with surrounding pillars 424 and 426. In FIG. 4B, although the poi 422 is surrounded by four pillars 428, 430, 432, and 434 face to face, the poi 422 is not electrically connected to any of these four pillars. Instead, the poi 422 is electrically connected to the pillars 424 and 426. Since the pillars 428, 430, 432, and 434 are not connected to the poi 422, these pillars are inactive, and hence provide only passive reflection in relation to the poi 422. These pillars no longer directly reflect into the poi 422.

If pillars along a diagonal line are driven, such as the pillars 402, 414, and 415 in FIG. 4A, the active pillars of the matrix are corner elements (414 and 415). In FIG. 4A, shear waves 416 and 418, which are bended, are emerging from these corner elements 414 and 415 and are impinging on the corners of the poi 402. However these shear waves 416 and 418 do not have constant phase because they are bended. Because these waves lack constant phase, because they must travel a greater distance to reach the poi 402, and the fact that a portion of their energy is dissipated along the side of the pillars 404 and 406, their effect on the Q of the poi 402 is reduced.

Figure 4C:
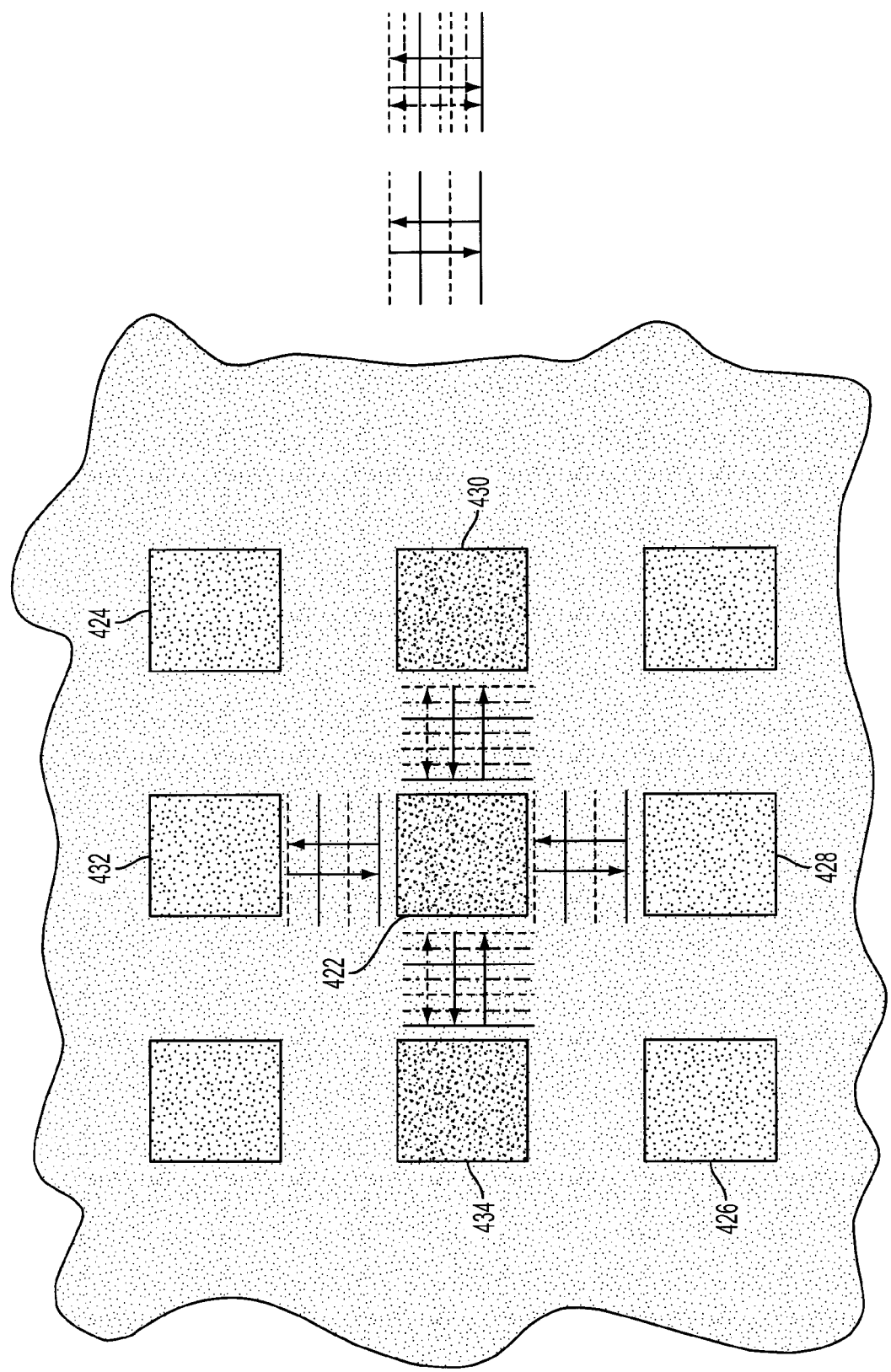
FIG. 4C is an illustration of the matrix of FIG. 4B having passive surrounding pillars.

FIG. 4C is an illustration of the matrix of FIG. 4B having passive surrounding pillars. That is, FIG. 4C is an illustration of direct transmission of shear waves overlapping with passive reflections from neighboring elements.

Damping, through energy leakage from the poi into the surrounding matrix material, is reduced if the acoustic impedance of the material becomes lower. If the acoustic impedance would be as low as the air's acoustic impedance the leakage can be completely neglected and this would be the ideal condition for achieving a high resonator q of the mechanical oscillation. But then the pillars cannot be kept in place. Therefore, a minimum of adhesive force between pillar and matrix material is required providing sufficient stability for operation and during processing the 1-3 piezo substrate for sensor applications. A suitable candidate for a matrix material exhibiting substantially lower acoustic impedance could be porous polymers.

That is, for example nm sized gas bubbles immersed into polymer during the fluid polymer state. After polymer-bubble mixture is poured around the pillar matrix of the 1-3 composite it will harden to a very low density interstitional material.

As noted above, a piezo-electric resonator represents one type of mechanical resonator. All mechanical resonators, regardless of the type, are excited or driven via application of some type of load or force. There are many different ways that such a force can be applied.

By way of background, a resonator is defined by a quality factor Qm, or its quality of resonance. If the resonance is excellent (i.e., very low damping), the resonator can be described as a very high Q resonator. If the resonator is not quite as good, it might be low Q resonator. For example, a typical oscillator (e.g., a quad oscillator) has a Q of roughly 200,000 to 1 million. The Q of resonators used in embodiments of the present invention is only about 30, to 40, etc. When the resonators are touched, which is the basic idea of acoustic impedance sensing, acoustic impedance provides friction to the oscillator. However, because of that friction, the resonator is damped. When the resonator is damped, it looses energy. The energy loss is expressed as a change of Q. The change of Q, in turn, is used to detect changes in the impedance. For example, the mechanical Q of a resonating pillar switches from a higher value to a lower value when the acoustic load switches from a valley to a ridge.

Figure 5:
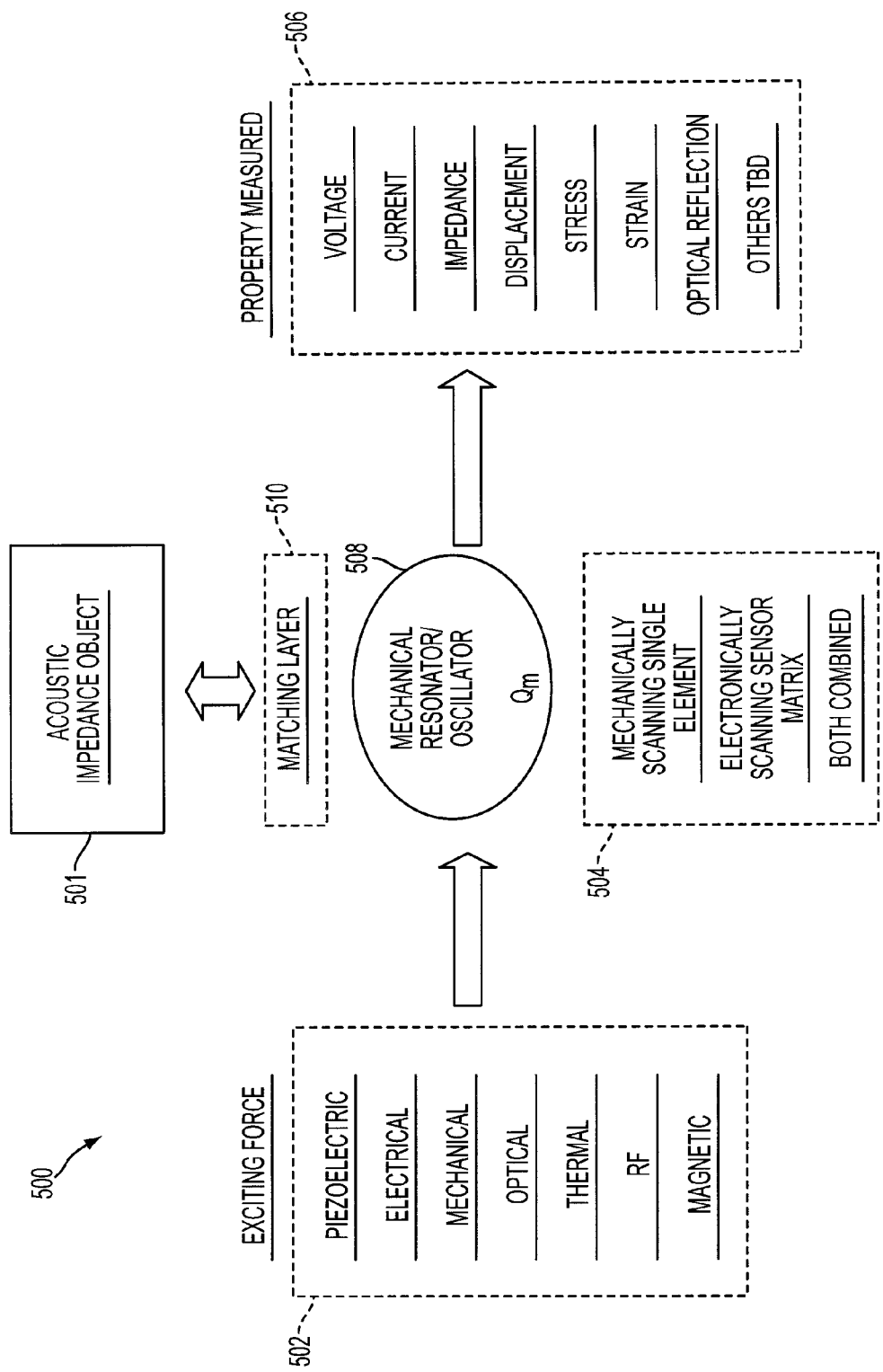
FIG. 5 is an illustration of elements of an acoustic impedance sensing system constructed in accordance with embodiments of the present invention.

FIG. 5 is an illustration of acoustic impedance sensing system 500 constructed in accordance with an embodiment of the present invention. In the present invention, sensing of an acoustic impedance object 501 (e.g., a finger) is based upon three essential variables: an exciting force 502, resonator scanning principles 504, and measured properties 506 that determine the degree of damping, the damping observation mechanism, and the manner of damping.

In FIG. 5, a mechanical resonator/oscillator 508 can operate in accordance with mechanical or electrical scanning principles 504, or a combination of both. Application of an initial oscillation push can occur via one of the excitation forces 502. These initial excitation forces 502 include, as a few examples, piezo-electric, electrical, mechanical, optical, thermal, radio frequency (RF) based, and magnetic. The mechanical resonator 508 can be driven by a number of different forces. Once the mechanical resonator 508 begins to oscillate, its vibration can be measured based upon a number of different properties 506.

The measurement properties 506 can include, by way of example, voltage, current, impedance, displacement, stress, strain, optical reflection, along with many others.

A matching layer 510 is provided to reduce reflection of energy passed from the acoustic impedance object 501 into the mechanical resonator 508. In the absence of the matching layer 510, reflection can be as high as 90%. The matching layer 510 can be of any suitable thickness, matched to predetermined acoustic impedance values.

FIG. 6 is an exemplary method 600 of practicing an embodiment of the present invention. In the method 600, a fingerprint is captured and stored in a computer memory in step 602. In step 604, the stored fingerprint is analyzed using acoustic sensing principles.

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What we claim is:

1. A sensor, comprising:
one or more mechanical devices for capturing an image of a fingerprint, each device including a matrix of pillars;
wherein a pillar of interest within the matrix is (a) only connected to diagonally adjacent pillars and (b) devoid of a connection to vertically and horizontally adjacent pillars.

2. The sensor of claim 1, wherein the pillars are formed of at least one of resonators and oscillators.

3. The sensor of claim 1, wherein a q factor of individual pillars within the matrix is optimized by adjusting a distance between pillars in accordance with a quarter shear wavelength at an operating wavelength.

4. The sensor of claim 3, wherein the q factor can be improved by reducing an acoustic impedance of matrix material, the reducing being facilitated by at least one of (i) reducing a density of the matrix material and (ii) reducing a stiffness of the matrix material.

5. The sensor of claim 4, wherein the sensor is configured to be excited via piezo-electric, magnetic, or electrical forces.

6. The sensor of claim 5, wherein the fingerprint image is captured via scanning a fingerprint structure in a manner that includes at least one from the group including mechanically and electronically.

7. The sensor of claim 6, wherein damping is observed using at least one from the group including voltage, current, impedance, displacement, stress, strain, and optical reflection.

8. The sensor of claim 7, further comprising a matching layer configured for reducing a difference in acoustic impedance between the sensor and a structure of the finger.

9. The sensor of claim 7, wherein the matching layer includes a predetermined thickness and acoustic impedance.

10. The sensor of claim 1, wherein the pillar of interest is electrically connected to the diagonally adjacent pillars.

11. The sensor of claim 1, wherein the vertically and horizontally adjacent pillars are inactive in relation to the pillar of interest.

12. The sensor of claim 1, wherein the vertically and horizontally adjacent pillars provide only passive reflection in relation to the pillar of interest.

13. The sensor of claim 1, wherein the pillars are of a square cross-section.

14. The sensor of claim 13, wherein the pillar of interest is surrounded by four pillars face to face and is devoid of a connection to the four pillars.

15. A method comprising:
capturing an image of a fingerprint using one or more mechanical devices, each device including a matrix of pillars;
wherein a pillar of interest within the matrix is (a) only connected to diagonally adjacent pillars and (b) devoid of a connection to vertically and horizontally adjacent pillars; and
monitoring excitation of pillars adjacent to a pillar of interest, the adjacent pillars being (a) only diagonally connected to the pillar of interest and (b) devoid of a vertical or horizontal connection to the pillar of interest.

* * * * *